US006892049B2

(12) United States Patent
Phalp et al.

(10) Patent No.: US 6,892,049 B2
(45) Date of Patent: May 10, 2005

(54) METHOD AND SYSTEM FOR SELECTING TRAINING MATERIALS

(75) Inventors: Daniel George Phalp, Toronto (CA); Kamal Ahluwalia, Toronto (CA)

(73) Assignee: Sun Microsystems, Inc., Palo Alto, CA (US)

( * ) Notice: Subject to any disclaimer, the term of this patent is extended or adjusted under 35 U.S.C. 154(b) by 200 days.

(21) Appl. No.: 10/199,300

(22) Filed: Jul. 22, 2002

(65) Prior Publication Data

US 2004/0014019 A1 Jan. 22, 2004

(51) Int. Cl.[7] .................................................. G09B 3/00
(52) U.S. Cl. ..................... 434/350; 434/219; 434/362; 707/1; 705/7; 705/9
(58) Field of Search ................................ 434/118, 219, 434/236, 258, 307 R, 308, 322, 323, 350.3; 705/1, 7–9, 11; 707/1; 709/204

(56) References Cited

U.S. PATENT DOCUMENTS

| | | | | |
|---|---|---|---|---|
| 5,344,324 A | * | 9/1994 | O'Donnell et al. | 434/258 |
| 6,398,556 B1 | * | 6/2002 | Ho et al. | 434/219 |
| 6,409,514 B1 | * | 6/2002 | Bull | 434/219 |
| 6,524,109 B1 | * | 2/2003 | Lacy et al. | 434/219 |
| 6,537,072 B2 | * | 3/2003 | Kanevsky et al. | 434/219 |
| 6,606,480 B1 | * | 8/2003 | L'Allier et al. | 434/362 |
| 6,644,974 B2 | * | 11/2003 | Adams et al. | 434/219 |
| 6,679,703 B2 | * | 1/2004 | Alling | 434/219 |
| 2002/0046074 A1 | * | 4/2002 | Barton | 705/8 |
| 2002/0046202 A1 | * | 4/2002 | Honda | 707/1 |
| 2002/0059376 A1 | * | 5/2002 | Schwartz | 709/204 |
| 2003/0101091 A1 | * | 5/2003 | Levin et al. | 705/11 |
| 2003/0139953 A1 | * | 7/2003 | Guenther et al. | 705/7 |
| 2003/0182173 A1 | * | 9/2003 | D'Elena et al. | 705/9 |
| 2004/0030566 A1 | * | 2/2004 | Rix | 705/1 |

OTHER PUBLICATIONS

"A Guide to Learning Management Systems": May, 2001; Element K LLC, p. 2–19.

* cited by examiner

*Primary Examiner*—Joe H. Cheng
(74) *Attorney, Agent, or Firm*—Kent A. Lembke; William J. Kubida; Hogan & Hartson LLP

(57) ABSTRACT

A system and method for selecting training materials is provided. In an aspect of the invention, a system is provided that includes a skill requirements database and a training products database. A user can input data representing a student's skill level and the system will select one or more suitable products from the training products database that can be used by the student to achieve a desired skill level.

19 Claims, 2 Drawing Sheets

METHOD AND SYSTEM FOR SELECTING TRAINING MATERIALS

FIELD OF THE INVENTION

The present invention relates to computer-based and on-line learning, and more particularly relates to a system and method of selecting training materials.

BACKGROUND OF THE INVENTION

Training materials provided for use with computers are well known. There are currently a wide variety of computer-based training materials offered on the market. In many instances, such training materials focus on interest-specific topics, such as alphabet recognition, playing the guitar, home decorating, gardening, playing golf, auto repairing, and the like. Some computer-based training materials are generally targeted for a specific age group, for example, alphabet recognition for young children, playing the guitar for adolescents, and auto repairing for adults. Such training materials are typically provided on diskettes, CDs and DVDs, which may require the student to install the software program onto his or her computer before initial use of the training materials.

With the development of the Internet, training materials provided on-line have also become available. The variety of courses being currently offered on-line is extensive, including such interest-specific courses mentioned above, and also degree courses such as calculus, biology, chemistry, physics, French, English, fine art, and the like. Indeed, there are virtual schools where students can take on-line courses to complete their required education and achieve certification, for example, high school diplomas, college degrees, and university degrees. Such on-line courses can require the student to download a software program from the network onto his or her computer before initial use of the training materials.

Irrespective of the delivery mechanism of the training materials, whether the training materials are provided on portable storage devices or over computer networks, computer-based training materials offer students the advantage of learning a specific subject without having to register and attend classes which may be offered at institutions located at great distance from the student's residence. Furthermore, such computer-based training materials allow students to learn at their own pace without having the pressure of their peers in a classroom setting. In the case of training materials provided on portable storage devices, the student can work through the lessons provided as many times as is needed by the student to gain an understanding of the materials, and also at a pace desired by the student. Since the computer-based training materials are installed on the computer, the student has access to it until such time as the student desires to remove the materials from his or her computer. Similarly, for training materials provided over computer networks, once the computer-based training materials are downloaded onto the student's computer, the student has access to the materials until such time as the student removes the training materials from his or her computer. Moreover, such computer-based training materials allow students to learn a specific subject at the retail price of the computer-based training materials, which is significantly less costly than attending a live course or hiring an instructor.

Generally, computer-based training materials are organized into levels, for example, basic levels, intermediate levels and advance levels on any one specific topic. For instance, a single CD may contain all the necessary training materials on auto repairing, covering all the different levels, from the basics of checking the oil to the advanced level of fixing the engine; it is at the student's discretion to determine the appropriate level of training material he or she requires based on his or her own assessment of his or her own actual skills on this particular topic. In other instances, a single CD may only contain training materials targeted for students at one particular level, the basic level, the intermediate level or the advanced level, on any one specific topic. Thus, the student needs to buy a set of CDs containing all levels of materials on a topic and work sequentially through each level or buy a single CD on any one particular level, based on the student's assessment of his or her own skill level. With respect to training materials being offered over a computer network, the student typically needs to download all levels of the training materials to his or her computer and work sequentially through the lessons provided at each level. Although a particular level of training materials may be downloaded by the student, it is at the student's discretion to determine the appropriate level of training material he or she requires based on his or her own assessment of his or her own skill level.

The present inventors have determined however, that while computer-based training materials provide students the opportunity to learn without having to attend classes, and to learn a subject at their own pace, such computer-based training materials currently on the market do not give students an accurate assessment of their skill level, and thus to make an accurate determination of the type of training materials required. Students choose the level of the training material based on his or her own assessment and assumption of his or her own skill set. In fact, it is common for students using existing computer-based training materials to work through lessons which the students have already possessed knowledge of the materials taught. Thus, such repetitive learning is time-consuming and cost ineffective, particularly as viewed by employers of companies where their employees are using such computer-based training materials.

SUMMARY OF THE INVENTION

In a first aspect of the invention there is provided a system for selecting training materials comprising a host server having a central processing unit (CPU) for peforming computing operations, a storage device for storing data representative of a plurality of skill requirements, skill levels and training products respective to the skill requirements and skill levels. The host server also includes an input device (i.e. A keyboard, or mouse, or the like) operable to receive data representative of a desired skill level for a student and an actual skill level for the student. The CPU of the host server is operable to map the desired and actual skills levels of the student to the skill requirements and the training products to determine which of the training products are suitable for the student in order for the student to improve the student's skill level or otherwise achieve the desired or required skill level. The host server further includes an output device (i.e. A computer monitor or the like) for outputting the suitable training products.

In particular, the input device and the output device are housed separately within a client computing device that includes a keyboard and monitor. The client device is connected to the host server, typically over a network. The system can also include a plurality of additional clients each having an input device and output device are connected to the host server via the network.

In another particular implementation of the first aspect, the data representative of skill requirements further includes a list of roles associated with one or more of the skill requirements, and the input device is further operable to receive a desired role for the student, and the desired skill level is determined by the central processing unit, based on the received role, the list of roles and the skill requirements associated with that role.

In another particular implementation of the first aspect, the data representative of the training products includes a plurality of metrics associated with each of the training products, the metrics including an entry skill level and an exit skill level for each of the products. The metrics can additionally include a relevancy measurement for each of the products, the relevancy measurement representing a significance of a particular training product in relation to a particular one of the skills associated with the product.

In a second aspect of the invention, there is provided a method for selecting a training product comprising:

receiving data representing a required skill a for a student;

receiving data representing actual skills in relation to the required skill for the student;

outputting a null result if the actual skills match or exceed the required skills;

determining at least one required training product for improving the actual skills if if the actual skills are less than the required skills and outputting the determined training product.

The above steps can be repeated until the actual skills match or exceed the required skills.

The null result can be a message presented on a display of an output computing device, that indicates that no training products are required for the student.

The data representing the required skill can be received in the form of a role for the student, which can be mapped to one or more associated skills, each of the skills having a requisite level associated therewith, and the data representing the actual skills is a measurement of the student's actual skill level in relation to the requisite skill level.

The role is a job title in an organization which the student has been selected to fulfill, or the role can be a diploma for a program at an educational institution in which the student is enrolled. The role can represent other positions or roles depending on the institution or organization that is offering the training products. A plurality of skills can be required for each role.

The actual skill level can be determined by receiving at least one of a subjective assessment measurements and an objective assessment measurement and applying a predefined weighting to each of the measurements. The subjective measurements can be a self-assessment of skill level provided by the student, or a subjective assessment of skill level made by a person other than the student, such as a supervisor or human resources manager.

The step of determining which training product is to be selected can be performed by comparing the requisite skill, the requisite skill level and the actual skill level against a list of training products each having one of the skills, an entry skill level and an exit skill level associated therewith, and selecting one or more of the training products such that the actual skill level is between the entry skill level and the exit skill level, and such that the entry skill level is below the requisite skill level.

Where the determined at least one training product is a an on-line course, an additional step can be the actual administering of the on-line course after the determining step.

In a third aspect of the invention, there is provided a method for determining an actual skill level of a student comprising the steps of:

receiving a first set of data representative of a self-assessment of the actual skill level by the student;

receiving a second set of data representative of an assessment of the actual skill level by an individual other than the student;

receiving a third set of data representative of results from a test relevant to assessing the skill level, the test having been administered to the student;

applying a preselected weighting to each of the received sets of data;

performing an operation to combine each of the weighted sets of data and generating a fourth set of data representing a determined actual skill level based on the combination; and, outputting the fourth set of data.

The method according to the fourth aspect can further comprise the steps of:

receiving data representing a required skill level a for a student;

outputting a null result if the actual skill level matches or exceed the required skill level; and, determining at least one required training product for increasing the student's skill level towards the determined actual skill level if the actual skill level is less than the required skill level and outputting the determined training product.

BRIEF DESCRIPTION OF THE DRAWINGS

The present invention will now be explained, by way of example only, with reference to certain embodiments and the attached FIGS, in which.

DETAILED DESCRIPTION OF THE PREFERRED EMBODIMENTS

Figure 1:
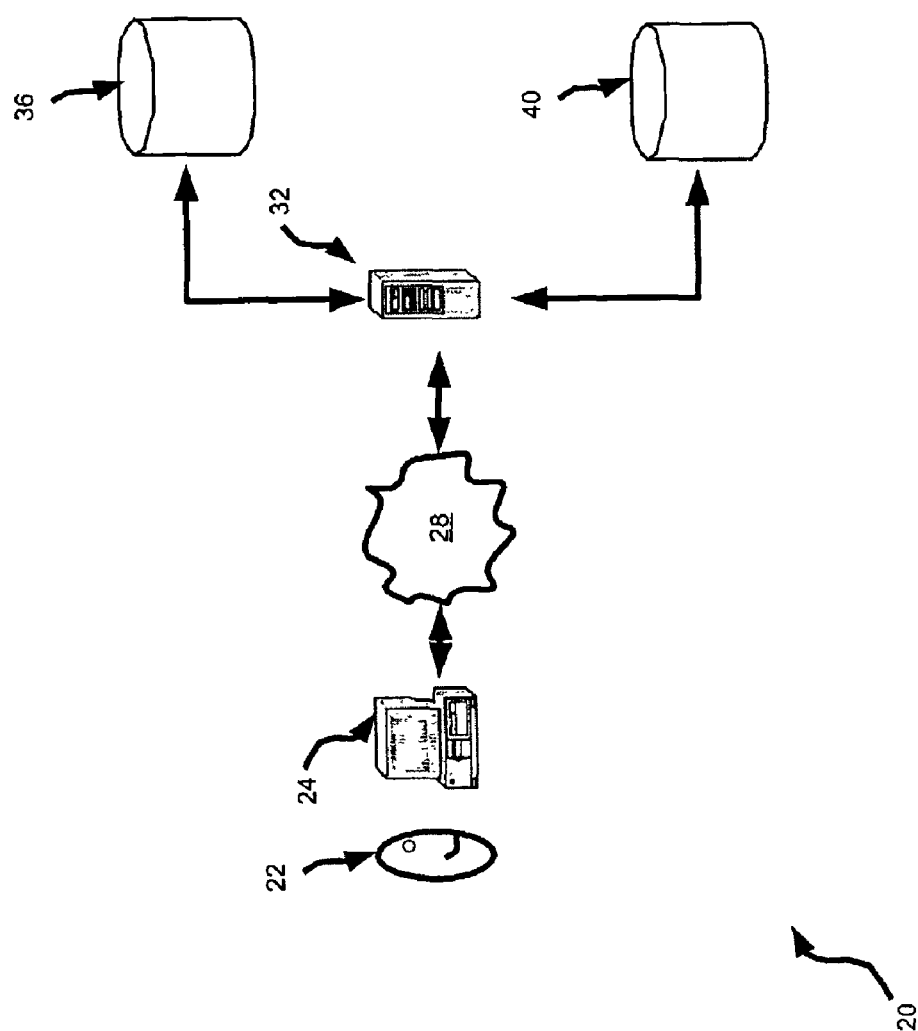
FIG. 1 is a system diagram of a system for selecting training materials in accordance with an embodiment of the invention; and, FIG. 2 shows a flow chart of a method for selecting training materials in accordance with another embodiment of the invention.

Referring now to FIG. 1, a system for selecting training materials is indicated generally at 20. System 20 comprises a client 24 that is operable to connect over a network 28 to a host server 32. Client 24 is thus used by a user 22 wishing to locate training materials and related information, while host server 32 is used by an educational institution, or other training service provider, to provide the information requested by user 22.

In a present embodiment, client 24 is a personal computer complete with keyboard, CPU, hard-disc drive, monitor and network interface card. It is to be understood, however, that client 28 can be any computing device such as a PDA, cell-phone, lap-top computer or the like that is operable to connect over network 28. Client 24 is thus operable to receive input from a user 22 using client 24 that wishes to access a host server 32 and present output to user 22 that is received from host server 32.

In a present embodiment, network 28 is the Internet, however, any network communication medium for interconnecting client 24 with host server 32 can be used. In a present embodiment, host server 32 is a Sun Enterprise 10440 Server, sold by Sun Microsystems of Palo Alto, Calif., but other types of servers can be used. Host server 32 is thus operable to host an application, such as a web-site or the like, for client 24 via network 28. Host server 32 is thus generally operable to offer an enterprise application over network 28 to user 22 accessing client 24. In the present embodiment, the enterprise application is an application to offer user 22 a selection of training materials.

Host server 32, in turn, is connected to two databases: a skill requirements database 36 and a training products database 40. (While database 36 and 40 are shown separately in FIG. 2 it is to be understood that databases 36 and 40 can be simply stored on a single hard disc drive housed within server 32.)

Skill requirements database 36 includes a list of roles requiring a set of one or more skills and associated level metrics with each skill, where each level metric is a numerical representation of how proficient an individual should be in a specific skill in order to be qualified to perform the particular role. Table 1 shows an example database that could be stored in skill requirements database 36, including skills and associated required skill level.

TABLE 1

Exemplary Skills Requirements Database

| Role | Skill | Required Level (0–5) |
|---|---|---|
| Database data entry clerk | Java Programming | 3 |
| Java Tester | Java Testing | 4 |
| Java Architect | Java Programming | 5 |
| Java System Manager | Java Programming | 4 |

The Role field of Table 1 includes a job title for which a particular student has been hired to fill. (As used in the present embodiment the term role means job position, but in other embodiments the concept of "role" can refer to any other position that has one or more required skills. For example, when used in an educational institution, the term "role" could refer to a particular academic certification.)

The Skill field of Table 1 includes a particular type of skill that the student must posses in order to perform the corresponding Role for which the student was hired.

The Required Level field of Table 1 includes a metric of a student's proficiency in order in order to satisfactorily perform the corresponding Role for which the student was hired. While certain embodiments of the invention described herein employ integers as level metrics, it is to be understood that any measurement system can be used, such as non-integral numbers and non-numeric tags, such as alphanumeric descriptors, can also be employed as level metrics.

In general, however, it is to be understood that Table 1 is merely exemplary of a particular skills requirements database, and other formats, structures, fields and metrics could be used or added for different skills requirements databases that would fall within the scope of the invention. Furthermore, it is to be understood that the "Role" field of Table 1 will typically have a plurality of Skills that are required for each Role, and that the simple requirement of one Skill per Role in Table 1 is for purposes of simplifying the explanation of the present embodiment.

Training products database 40 includes a list of training products that can be used to bring a student to the Required Level of an associated Skill as stored in skill requirements database 36. Table 2 shows an example database that could be stored in training products database 36, including products and associated information regarding the skill levels that can be expected to be attained using a particular product.

TABLE 2

Exemplary Training Products Database

| Skill | Product Number | Product Name | Entry Level (0–5) | Exit Level (0–5) |
|---|---|---|---|---|
| Java Programming | 1 | Java for Dummies (On-line course) | 0 | 1 |
| Java Programming | 2 | Java for Beginners (On-line course) | 1 | 2 |
| Java Programming | 3 | Java for Intermediates (On-line course) | 1 | 3 |
| Java Programming | 4 | Java for Experts (On-line course) | 3 | 5 |
| Java Testing | 5 | Analytical Tools for Java (On-line course) | 2 | 4 |

The Skill field of Table 2 corresponds to the list of Skills shown in Table 1, and thus provides the relational link by which information in Table 1 can be matched with Table 2.

The Product Number and Product Name fields of Table 2 correspond to each other, and are used to uniquely identify the particular product which can be used to help a student learn the corresponding Skill.

The Entry Level field of Table 2 indicates the minimum current skill level that the student needs to actually possess in order to more completely benefit from the particular corresponding Product listed in the Product Name Field. Typically, the Entry Level is less than the Required Skill Level of that associated skill as listed in Table 1.

The Exit Level field of Table 2 indicates the resulting skill level that the particular student should expect to achieve after actually having used the corresponding Product listed in the Product Name Field. Typically, the Exit Level is less than or equal to the Required Skill Level of that associated skill as listed in Table 1, but at least one Product has an Exit Skill level that meets or exceeds the Required Skill Level of that associated skill as listed in Table 1.

In general, however, it is to be understood that Table 2 is merely exemplary, and other formats, structures, fields and metrics could be used, added or substituted, as desired and that such variations are within the scope of the invention. One particular metric, (in addition to the "entry level" and "exit level" metrics shown in Table 2), that can be considered of use is a "Relevancy" metric, which would reflect how relevant a particular product was to a particular skill. Furthermore, while the training products in Table 2 are on-line courses, other types of training products are within the scope of invention, including text books and class room courses. Other types of training products will occur to those of skill in the art.

Host server 32 is thus operable to receive a role and a set of required skills for a particular student, and an assessment of the student's particular skill level, and utilize the data and associated metrics stored in skill requirements database 36 and training products database 40 to determine one or more products that the particular student should use in order to achieve the required skill level for the particular role that the student will be assuming.

Figure 2:
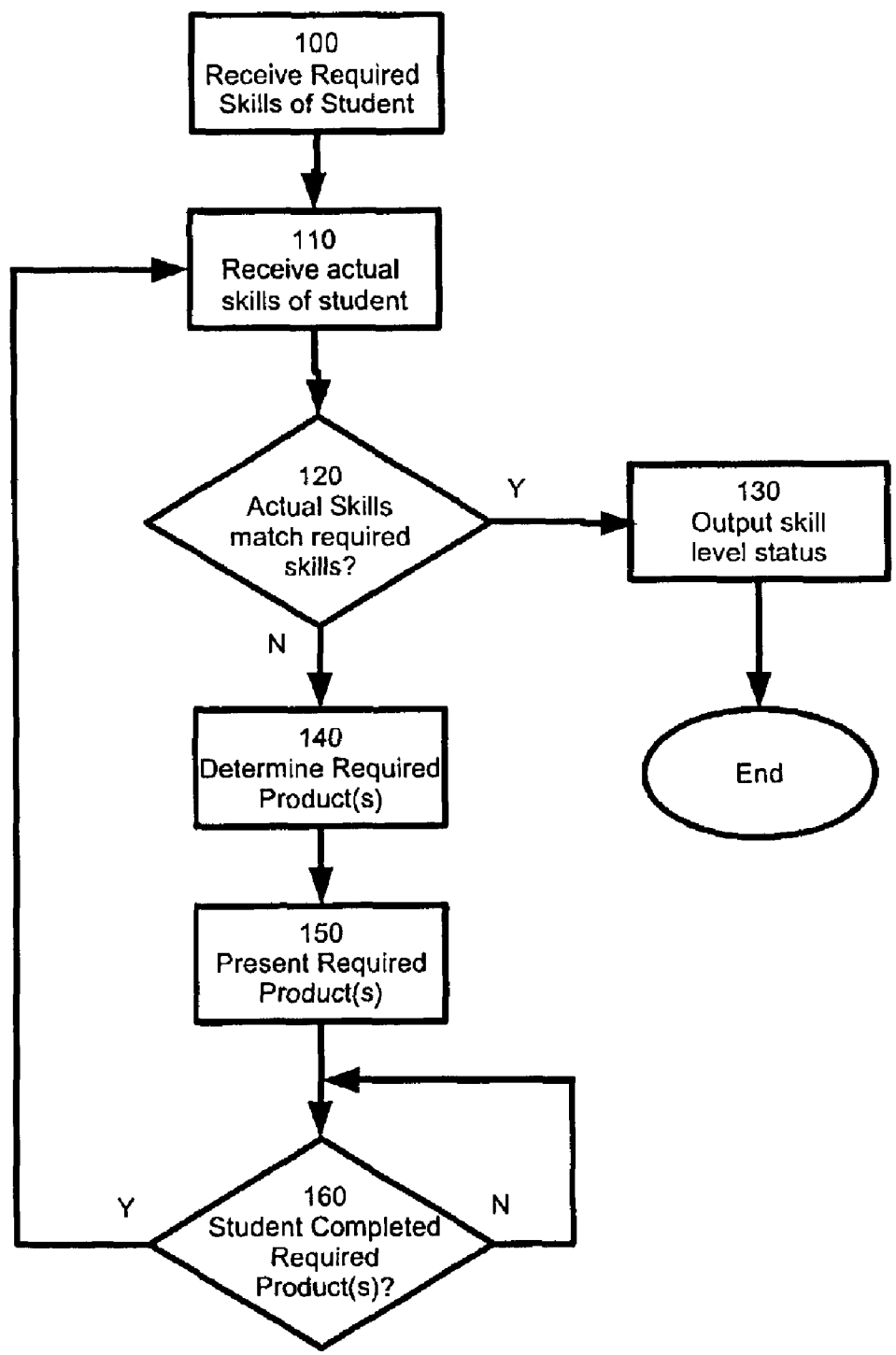

Referring now to FIG. 2, a method for selecting training materials will now be discussed. In order to assist in the explanation of the method, it will be assumed that the method in FIG. 2 is operated using system 20. Furthermore, the following discussion of the method of FIG. 2 will lead to further understanding of system 20. (However, it is to be understood that system 20 and/or the method of FIG. 2 can be varied, and need not work exactly as discussed herein in conjunction with each other, and that such variations are within the scope of the present invention.)

Beginning at step 100, a set of required skills for a student is received. In general, step 100 involves entering in data representative of a required set of skills for a student. When implemented using system 20, user 22 will use client 24 to enter the data represented in Table 3.

TABLE 3

Exemplary Data representing a student's required skills

| Student Name | Student Role |
| --- | --- |
| John Smith | Java Architect |

Thus, data in Table 3 is then transmitted over network 28 to server 32. In turn, server 32 creates a unique record for the student "John Smith" and notes that the student John Smith intends to assume the role of Java Architect. Server 32 thus accesses skill requirements database 36 and (using the information in Table 1) determines that a person wishing to assume the role of Java Architect must have the skill of Java Programming, and must possess such skill at the highest level—Level 5.

The method then advances to step 110, at which point the actual skill level of the student is received. The means for receiving the student skill level is not particularly limited, and can be accomplished in a variety of ways. For example, certain subjective criteria can be used, such as self-evaluation, or an evaluation could be performed by the supervisor (or other individual) that has chosen the particular student to assume the role identified at step 100. Objective criteria can also be used, such as using a standardized test that is generally accepted as providing substantially objective feedback as to the particular student's current skill level. In addition, a desired weighted combination of the foregoing subjective and objective criteria can be used, as desired. Other means for determining a particular student's given skill level will occur to those of skill in the art, such as a prioritization of received criteria, wherein a first received criteria is used if it is available, otherwise a second received criteria is used. Whatever means chosen, when step 110 implemented using system 20, a user 22 will typically use client 24 to input data representative of the preselected criteria that is used to actually determine the skill level of the student.

Continuing with the example, it will be assumed that, user 22 will enter in a combination of evaluation data including a self-evaluation number, a supervisor's evaluation of the student, and test results of a standardized test taken by John Smith will be entered by user 22 into client 24, and that this combination of evaluation data will be transferred to server 32, which in turn will apply an equal weighting to each of the components of the evaluation data. For purposes of continuing with the explanation it will be assumed that the skill level for John Smith in the skill of Java Programming is determined to be at Level 2.

The method then advances to step 120, where a determination is made as to whether the student's actual skills match the required skills for the particular role of the student. At this step 120, a comparison is thus made between the required skill level received at step 100, and the actual skill level received at step 110. If the actual skill level is greater than or equal to the required skill level, then the method advances to step 130, and a "null" message is outputted to user 22, to the effect that that the student already possesses the required skills for the particular role and no further training is required.

If, however, at step 120 the actual skill level is less than the required skill level, then the method,advances to step 140. Continuing with the present example, since the actual skill level of John Smith was determined to be Level 2, and the required skill level of John Smith was determined to be Level 5, then a determination at step 120 is made that John Smith's skill level is below the required skill level, and the method advances to step 140.

Next, at step 140, the training products that are needed to bring John Smith to the required skill level are determined. When implemented using system 20, step 140 is performed by server 32, which accesses training products database 40 and searches for training products that match the particular skill requirements of the particular student. Continuing with the present example, the information in Table 2 is thus examined by server 32, and compared with the Actual Skill Level of "John Smith", and the information presented in Table 4 is extracted from Table 2.

TABLE 4

Determined Required Training Products for John Smith

| Skill | Product Number | Product Name | Entry Level (0–5) | Exit Level (0–5) |
| --- | --- | --- | --- | --- |
| Java Programming | 3 | Java for Intermediates (On-line course) | 1 | 3 |

Those of skill in the art will understand that the information in Table 4 was determined because Product 3 had an "Entry Level" below or equal to John Smith's current actual Skill Level (John Smith's actual skill level now being at Level 2), and because Product 3 is a product that is relevant to furthering the skill of "Java Programming".

The method then advances to step 150, at which point the required training products determined at step 140 are presented, so that arrangements can thus be made for the student to use the particular product to advances the student's training to, or towards, the required skill level for the student.

When step 150 is implemented on system 20, step 150 is accomplished by outputting the determined required training products to user 22 so that user 22 can arrange for the student to access the particular training product. Or, where user 22 is the actual student and the training product is an on-line course, then the actual training product can be presented on client 24 so that the student can take the product.

Continuing with the present example, it will be assumed that user 22 is actually "John Smith", the student in question, and thus the information in Table 4 will be presented to John Smith, and the actual on-course, Product Number 3, "Java for Intermediates" will be presented to John Smith directly on client 24.

The method then advances to step 160, where the method loops backs on itself, or "waits", until the student has actually completed the product presented at step 150. Thus, when step 160 is implemented on system 20 using the present example, server 32 will simply "wait" until John Smith has completed taking the on-line course "Java for Intermediates".

Once it is determined at step 160 that the student has completed the product, the method then returns to step 110, where the actual skill level of the student is then received again. When step 110 is reached from step 160, step 110 can be performed substantially the same way as previously described, or it can be assumed that the student has achieved the "Exit Level" associated with the determined product from step 150 and thus the received level at step 110 as reached from step 160 is assumed to be the Exit Level from the Product(s) used by the student.

For purposes of continuing explaining the present example, it will be assumed that, once step 110 is reached via step 160, once "John Smith" has completed the on-line course his skill level will be assumed to be at the "Exit Level" listed in Table 4, i.e. Level 3. Thus, having made one pass through the method of FIG. 2, John Smith will be deemed to have advanced from Level 2 to Level 3 in the skill of "Java Programming" in order to fulfill his Role as Java Architect.

The method then advances again step 120, which is performed as previously described. Continuing with the present example, since the Actual Skill level of "John Smith" is still only Level 3, and the Required Skill Level of "John Smith" is Level 5, then it will be determined at step 120 that the student's actual skill level still does not match the required skill level, and the method advances again to step 140.

This time, at step 140, the information in Table 2 is thus examined by server 32 and compared again with the Actual Skill Level of "John Smith", and the information presented in Table 5 is extracted from Table 2.

TABLE 5

Determined Required Training Products for John Smith

| Skill | Product Number | Product Name | Entry Level (0–5) | Exit Level (0–5) |
|---|---|---|---|---|
| Java Programming | 4 | Java for Experts (On-line course) | 3 | 5 |

Those of skill in the art will understand that the information in Table 5 was determined because Product 4 had an "Entry Level" below or equal to John Smith's current actual Skill Level (i.e. John Smith's actual skill level now assumed to be at Level 3), and because Product Number 4 is a product that is relevant to acquiring the skill of "Java Programming" with an expected Exit Level of 5.

The method advances again through 150, 160 and back to 110 and 120 as previously described. It is assumed that John successfully completes the course listed in Table 5, and achieves the skill level of 5 for Java Programming. This time, however, when the method reaches step 120 again it is determined at step 120 that John Smith's actual skill level now matches the required skill level associated with the role of Java Architect as listed in Table 1 (i.e. Level 5), and the method advances to step 130 where an output is presented on client 24 informing user 22 that no further training products are required for John Smith to fulfill his role as Java Architect.

While only specific combinations of the various features and components of the present invention have been discussed herein, it will be apparent to those of skill in the art that desired subsets of the disclosed features and components and/or alternative combinations of these features and components can be utilized, as desired. For example, the present invention can be used by a university or other educational institution to determine and/or present which courses could be of interest, or required, by a particular student at the time of enrollment or at the beginning of a school term. In the case of an educational institution such as a university, the "Role" field of Table 1 could be substituted with an "Enrolled Program" field that indicated the particular degree or other program offered by the educational institution. The concept of "Role" can be thus be varied (or even eliminated) to match the particular institution or organization utilizing the present invention.

It will be further understood that system 20 in FIG. 1 can typically have a plurality of client computing devices attached to network 28, and that host server 32 can serve each of the client computing devices. Further, the client computing device and the host server can reside on the same physical machine.

While certain embodiments of the invention are described having a skill requirements database, it is understood that the skills and associated level metrics for each skill can be inputted by the user of the system.

The present invention can be generally applicable to any training or educational service provider that offers a large range of courses, text books and other training products that needs to efficiently present a list of products of interest to a particular student wishing to achieve a desired skill and/or skill level. As such, the particular type of training product delivered according to the present invention is not particularly limited.

While the method in FIG. 2 is discussed in terms of using a computer system to implement the method, it will be understood that the steps performed in FIG. 2, and variations thereof, can be performed manually or through other means, and that other such means of processing those method steps are within the scope of the invention.

Additionally, while the step of determining the required products of the method illustrated in FIG. 2 has been described as the selection of a single product suitable for the student's particular requirements, it will be understood that server 32 can determine a sequential list of one or more products that the student such that the student's skill level can be expected to equal or exceed the required skill level for the skill or skills in question. The sequential list of one or more products can be determined in a variety of ways, including determining a number of sequential lists of products that can be expected to further the student's skills in question to the required level and selecting one or more of the sequential lists of products based on a set of one or more conditions, such as expected student study time and cost of materials. Further, the step of determining required products can include the determination of more than suitable product or sequential product list for the student, and the step of presenting required products can enable a user, possibly the student himself, to select one of the products or sequential product lists. In this case, it can be advantageous to present additional information for the presented products to assist the user to make the selection.

In some circumstances, it can be desirable to terminate the method of FIG. 2 after the step of presenting required products. For example, where an on-line training products retailer operates server 32 and wishes to cater to one-time purchasers of training products, it can be desirable to determine and present one or more products or sequential product lists to assist the user to select and purchase training products that are appropriate for his needs.

Further, in some circumstances, the step of determining required products of FIG. 2 can include the possibility of determining one or more products that do not satisfy the requirements of the student, based on perceived value to the operator of server 32, user 22 and/or the student.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A system for selecting training materials comprising:
   a host server having a central processing unit (CPU) for performing computing operations, a storage device for storing data representative of a plurality of skill requirements, skill levels and training products respective to said skill requirements and skill levels, and an input device operable to receive data representative of a desired skill level for a student and an actual skill level for said student;
   said CPU operable to map said desired and actual skills levels of said student to said skill requirements and said training products to determine which of said training products are suitable for said student in order for said student to achieve said desired skill level; and,
   said host server further having an output device for outputting said suitable training products;
   wherein said data representative of said training products includes metrics associated with each of said training products, said metrics including an entry skill level and an exit skill level for each of said products.

2. The system according to claim 1 wherein said input device and said output device are housed within a client computing device connected to said host server via a network.

3. The system according to claim 2 wherein a plurality of said client computing devices each having said input device and said output device is connected to said host server via said network.

4. The system according to claim 1 wherein said data representative of skill requirements further includes a list of roles associated with one or more of said skill requirements, and said input device is further operable to receive a desired role for said student, and said desired skill level is determined by said central processing unit based on said received role, said list of roles and said associated skill requirements.

5. The system according to claim 1 wherein said metrics include a relevancy measurement for each of said products, said relevancy measurement representing a significance of a particular training product in relation to a particular one of said skills associated with said product.

6. A method for selecting a training product comprising:
   receiving data representing a required skill for a student;
   receiving data representing actual skill in relation to said required skill for said student;
   outputting a null result if said actual skill match or exceed said required skill; and
   determining at least one required training product for improving said actual skill if said actual skill is less than said required skill and outputting said determined training product;
   wherein said actual skill is determined by receiving a subjective assessment measurement and an objective assessment measurement and by applying a predefined weighting to said measurements.

7. The method according to claim 6 comprising the additional step of repeating said receiving data representing actual skill, said outputting a null result, and said determining until said actual skill matches or exceed said required skill.

8. The method according to claim 6 wherein said null result is a message presented on a display of an output computing device that indicates that no training products are required for said student.

9. The method according to claim 6 wherein said data representing a required skill is received in the form of a role for said student which is mapped to one or more associated skills, each of said skills having a requisite skill level associated therewith, and said data representing said actual skills is a measurement of said student's actual skill level in relation to said requisite skill level.

10. The method according to claim 9 wherein said role is a job title in an organization which said student has been selected to fulfill.

11. The method according to claim 9 wherein said role is a diploma for a program at an educational institution in which said student is enrolled.

12. The method according to claim 9 wherein a plurality of skills is required for each role.

13. The method according to claim 9 wherein said determining step is performed by comparing said requisite skill, said requisite sill level and said actual skill level against a list of training products, each of said training products being associated with at least one of said skills, and each of said training products having an entry skill level and an exit skill level associated with a respective skill, and said determining is performed by selecting one or more of said training products where said actual skill level is between said entry skill level and said exit skill level for that selected training product, and such that said entry skill level is below said requisite skill level for that selected training product.

14. The method according to claim 6 wherein said subjective assessment measurement comprises a self-assessment of skill level provided by said student.

15. The method according to claim 6 wherein said subjective assessment measurement is an assessment made by an individual other than said student.

16. The method according to claim 6 wherein said determined training products is at least one of a class-room course or a text book.

17. The method according to claim 6 wherein said determined at least one training product is an on-line course and comprising the additional step of administering said on-line course after said determining step.

18. A method for determining an actual skill level of a student comprising the steps of:
   receiving a first set of data representative of a self-assessment of said actual skill level by said student;
   receiving a second set of data representative of an assessment of said actual skill level by an individual other than said student;
   receiving a third set of data representative of results from a test relevant to assessing said skill level, said test having been administered to said student;
   applying a preselected weighting to each of said received sets of data;
   performing an operation to combine each of said weighted sets of data and generating a fourth set of data representing a determined actual skill level based on said combination; and,
   outputting said fourth set of data.

19. The method according to claim 18 further comprising the steps of:

receiving data representing a required skill level for a student;

outputting a null result if said actual skill level matches or exceed said required skill level;

determining at least one required training product for increasing said student's skill level towards said determined actual skill level if said actual skill level is less than said required skill level and outputting said determined training product.

* * * * *

UNITED STATES PATENT AND TRADEMARK OFFICE
CERTIFICATE OF CORRECTION

PATENT NO. : 6,892,049 B2
DATED : May 10, 2005
INVENTOR(S) : Daniel George Phalp and Kamal Ahluwalia It is certified that error appears in the above-identified patent and that said Letters Patent is hereby corrected as shown below:

<u>Column 12,</u>
Line 25, "sill" should be -- skill --.

Signed and Sealed this

Twenty-third Day of August, 2005

JON W. DUDAS
*Director of the United States Patent and Trademark Office*